(12) United States Patent
Foulon et al.

(10) Patent No.: US 7,985,390 B2
(45) Date of Patent: Jul. 26, 2011

(54) SILICA-INTERCALATED HYDROTALCITE, AND USE THEREOF AS FILLER IN POLYMER COMPOSITIONS

(75) Inventors: Michel Foulon, Vires sur Marne (FR); Laurence Stelandre, Marc En Baroeuil (FR)

(73) Assignee: Rhodia Chimie, Aubervilliers (FR)

( * ) Notice: Subject to any disclaimer, the term of this patent is extended or adjusted under 35 U.S.C. 154(b) by 730 days.

(21) Appl. No.: 10/584,356

(22) PCT Filed: Dec. 22, 2004

(86) PCT No.: PCT/FR2004/003354
§ 371 (c)(1), (2), (4) Date: May 14, 2007

(87) PCT Pub. No.: WO2005/063627
PCT Pub. Date: Jul. 14, 2005

(65) Prior Publication Data
US 2007/0208121 A1    Sep. 6, 2007

(30) Foreign Application Priority Data

Dec. 22, 2003  (FR) ..................................... 03 15173

(51) Int. Cl.
*C01F 5/14*   (2006.01)
*C01F 5/24*   (2006.01)
*C01F 7/34*   (2006.01)
*C08K 3/20*   (2006.01)
*C08K 3/26*   (2006.01)

(52) U.S. Cl. .......................... 423/111; 423/155; 524/451
(58) Field of Classification Search ................. 524/451; 423/111, 155
See application file for complete search history.

(56) References Cited

U.S. PATENT DOCUMENTS

| 4,637,992 | A | 1/1987 | Lewis et al. |
| 4,717,513 | A | 1/1988 | Lewis et al. |
| 5,246,899 | A * | 9/1993 | Bhattacharyya ................ 502/84 |
| 6,306,494 | B1 | 10/2001 | Takahashi et al. |
| 7,046,439 | B2 * | 5/2006 | Kaminsky et al. ............ 359/452 |

FOREIGN PATENT DOCUMENTS

| EP | 0 976 681 A | 2/2000 |
| EP | 1 069 074 A1 | 1/2001 |

OTHER PUBLICATIONS

S. Brunauer et al., "Adsorption of Gases in Multimolecular Layers", *J. Chem.* Soc, vol. 30, Feb. 1938, pp. 309-319.

* cited by examiner

*Primary Examiner* — Satya B Sastri
(74) *Attorney, Agent, or Firm* — Buchanan Ingersoll & Rooney, P.C.

(57) ABSTRACT

The invention relates to hydrotalcite intercalated by precipitated silica, and to the use thereof as a charge in a polymer composition. The invention also relates to polymer compositions comprising one such charge, and to finished articles based on such compositions.

15 Claims, No Drawings

SILICA-INTERCALATED HYDROTALCITE, AND USE THEREOF AS FILLER IN POLYMER COMPOSITIONS

This application is an application under 35 U.S.C. Section 371 of International Application Number PCT/FR2004/003354 filed on Nov. 22, 2004.

The present invention relates to hydrotalcite intercalated using silica and to its use as filler in polymer compositions.

It also relates to the polymer compositions thus obtained.

Finally, it additionally relates to the finished articles based on these compositions.

It is known to employ reinforcing white fillers in polymers, in particular elastomers, such as, for example, precipitated silica. However, the results are not always those hoped for.

Carbonate-comprising hydrotalcite cannot be effectively used as filler for polymers as it results in inadequate reinforcing performances.

The use of calcined hydrotalcite freed from carbonate in polymer compositions can make it possible to achieve a satisfactory compromise in performances; however, its dispersibility in the polymer matrix is not satisfactory, in particular for applications requiring use under severe stress conditions.

The aim of the invention is to provide a novel filler for polymer compositions which provides them with a highly satisfactory compromise in mechanical properties, namely, preferably, good rheological properties, a very good aptitude for vulcanization, particularly advantageous dynamic properties and good reinforcing in terms of modulus, while exhibiting very good dispersion in these polymer compositions.

With this aim, the present invention provides a novel hydrotalcite which can be used in particular as filler, in particular as reinforcing filler, in a polymer composition.

A subject matter of the present invention is thus a hydrotalcite intercalated by silica, in particular precipitated silica.

Even if the hydrotalcite according to the invention (that is to say, the silica-intercalated hydrotalcite) can comprise at least one monovalent cation, such as, for example, Li, and at least one trivalent cation, it instead usually comprises at least one divalent cation and at least one trivalent cation; the divalent cation/trivalent cation molar ratio is then generally between 1 and 8, preferably between 2 and 6.

The divalent cation can in particular be Mg, Ni, Zn or Co.

The trivalent cation can, for example, be Al, Ga, Fe or Cr.

Advantageously, the divalent cation is Mg and the trivalent cation is Al (magnesium aluminum hydrotalcite); the Mg/Al molar ratio is then generally between 1.5 and 5, preferably between 2 and 4, in particular between 2 and 3.

The hydrotalcite according to the invention can be prepared by the process described below, this process constituting another subject matter of the invention.

Preferably, the hydrotalcite according to the invention is obtained by simultaneously adding, to a vessel heel formed of water, a solution comprising salts (in particular acid salts) of the two abovementioned types of cations, generally Mg and Al (or two solutions each comprising a salt (in particular acid salt) of one of the two cations), a silicate solution and a basic agent solution (the latter being used in particular to regulate the pH, in particular at a value of between 8 and 11, for example at approximately 9).

Use is preferably made of a solution simultaneously comprising salts of the two types of cations, generally chlorides, in particular in the case of Mg and Al.

The silicate solution used can be an alkali metal silicate solution, in particular a potassium silicate solution or, preferably, a sodium silicate solution. In the latter case, the sodium silicate generally exhibits an $SiO_2/Na_2O$ ratio by weight of between 2.5 and 4.5, in particular between 3.0 and 4.0, for example between 3.3 and 3.8.

The basic agent solution employed can be an aqueous ammonia solution or, preferably, a sodium hydroxide solution.

The duration of the simultaneous addition can vary between 30 and 90 minutes, for example between 45 and 60 minutes; the temperature of the reaction medium can be maintained between 20 and 95° C.; in particular, the temperature during the simultaneous addition can be maintained between 20 and 40° C., in particular between 25 and 35° C., for example at approximately 30° C.

On conclusion of this simultaneous addition, the product (precipitate) obtained can subsequently be heated, in particular in order to be crystallized; the temperature of the reaction medium can thus be brought to and maintained between 80 and 95° C., in particular between 85 and 95° C., for example at approximately 90° C., especially for 1 to 3 hours, for example for 2 hours.

The hydrotalcite obtained can subsequently be washed, in particular with water, in particular in order to remove the alkali metal salts which would be formed.

The basic units of the hydrotalcite according to the invention usually exist in the form of platelets, generally substantially hexagonal platelets. The greatest dimension of these platelets can be between 15 and 80 nm, in particular between 20 and 70 nm, especially between 30 and 50 nm; their thickness can be between 1 and 10 nm, in particular between 2 and 8 nm, especially between 3 and 7 nm.

Silica is intercalated between the layers of the hydrotalcite according to the invention.

According to an alternative form of the invention, the hydrotalcite can comprise silica essentially, in particular solely (absence of extragranular silica), intercalated between its layers: this is the case in particular when the amount of silicate employed during the preparation is not in excess, in particular so as to obtain an Si/trivalent cation, generally Si/Al, molar ratio of 1 in the hydrotalcite.

According to another alternative form of the invention, the hydrotalcite can comprise, in addition to the silica intercalated between its layers, silica at its surface (presence of extragranular silica): this is the case in particular when the amount of silica employed during the preparation is in excess, in particular so as to obtain an Si/trivalent cation, generally Si/Al, molar ratio of greater than 1, for example of greater than 2, in the hydrotalcite; silica then precipitates next to the silica-intercalated hydrotalcite. This extragranular silica can also contribute to reinforcing the polymers when the hydrotalcite according to the invention is used as filler in the latter.

The hydrotalcite according to the invention preferably has a BET specific surface of between 100 and 300 m²/g, generally between 120 and 220 m²/g, in particular between 130 and 200 m²/g; it is, for example, between 150 and 180 m²/g. The BET surface is determined according to the Brunauer-Emmett-Teller method described in the Journal of the American Chemical Society, Vol. 60, page 309, February 1938, corresponding to standard NFT 45007 (November 1987).

It generally has a CTAB specific surface of between 100 and 300 m²/g, in particular between 120 and 210 m²/g, especially between 130 and 190 m²/g; it can be between 150 and 180 m²/g. The CTAB surface is the external surface determined according to standard NF T 45007 (November 1987-5.12).

The hydrotalcite according to the invention or prepared according to the process of the invention has a particularly advantageous application as filler, in particular as reinforcing filler, for natural or synthetic polymers.

The polymer compositions in which at least one hydrotalcite according to the invention or prepared according to the process of the invention is used as filler, in particular as reinforcing filler, and which constitute another subject matter of the invention are generally based on one or more polymers or copolymers, in particular on one or more elastomers, in particular thermoplastic elastomers, preferably exhibiting at least one glass transition temperature of between −150 and +300° C., for example between −150 and +20° C.

Mention may be made, as possible polymers, of diene polymers, in particular diene elastomers.

For example, mention may be made of the polymers or copolymers deriving from aliphatic or aromatic monomers comprising at least one unsaturation (such as, in particular, ethylene, propylene, butadiene, isoprene, styrene), poly(butyl acrylate) or their blends; mention may also be made of silicone elastomers, functionalized elastomers (for example, functionalized by functional groups capable of reacting with the surface of the hydrotalcite) and halogenated polymers. Mention may be made of polyamides.

The polymer (copolymer) can be a bulk polymer (copolymer), a polymer (copolymer) latex or else a solution of polymer (copolymer) in water or in any other appropriate dispersing liquid.

Mention may be made, as diene elastomers, for example, of polybutadienes (BR), polyisoprenes (IR), butadiene copolymers, isoprene copolymers or their blends, and in particular styrene/butadiene copolymers (SBR, in particular ESBR (emulsion) or SSBR (solution)), isoprene/butadiene copolymers (BIR), isoprene/styrene copolymers (SIR), isoprene/butadiene/styrene copolymers (SBIR) or ethylene/propylene/diene terpolymers (EPDM).

Mention may also be made of natural rubber (NR).

The polymer compositions can be vulcanized with sulfur (vulcanizates are then obtained) or crosslinked, in particular with peroxides.

Another compound, such as precipitated silica, which is in particular highly dispersible, can optionally also be employed as filler; while the amount by weight of precipitated silica employed may then be exceeded by that of the hydrotalcite, it may also be equal to or exceed that employed for the hydrotalcite; the hydrotalcite and the silica can then be introduced into the polymer(s) in the form of a mixture or separately. However, generally, the filler used is formed entirely of hydrotalcite according to the invention or prepared according to the process of the invention.

Generally, the polymer compositions additionally comprise at least one (hydrotalcite/polymer) coupling agent and/or at least one coating agent; they can also comprise, inter alia, an antioxidant.

Use may in particular be made, as coupling agents, as nonlimiting examples, of "symmetrical" or "asymmetrical" silane polysulfides; mention may more particularly be made of bis$((C_1-C_4)$alkoxy$(C_1-C_4)$alkylsilyl$(C_1-C_4)$alkyl) polysulfides (in particular disulfides, trisulfides or tetrasulfides), such as, for example, bis(3-(trimethoxysilyl)propyl) polysulfides or bis(3-(triethoxysilyl)propyl) polysulfides. Mention may also be made of monoethoxydimethylsilylpropyl tetrasulfide.

The coupling agent can be grafted beforehand to the polymer.

It can also be employed in the free state (that is to say, not grafted beforehand) or grafted at the surface of the hydrotalcite. It is the same for the possible coating agent.

The invention can in particular make it possible to reduce the amount of coupling agent to be employed in the polymer compositions while not being harmful to their properties in the vulcanized state.

The coupling agent can optionally be used in combination with an appropriate "coupling activator", that is to say a compound which, mixed with this coupling agent, increases the effectiveness of the latter.

The proportion by weight of hydrotalcite according to the invention or prepared according to the process of the invention in the polymer composition can vary within a fairly wide range. It usually represents 4 to 80%, in particular 20 to 80%, for example 30 to 70%, of the amount of the polymer(s).

The hydrotalcite according to the invention or prepared according to the process of the invention provides the polymer composition in which it is employed with a highly satisfactory compromise in mechanical properties, namely, preferably, good rheological properties, a very good aptitude for vulcanization, particularly advantageous dynamic properties and good reinforcing in terms of modulus, while exhibiting very good dispersion in this polymer composition.

Thus, while advantageously exhibiting, in the polymer composition, a dispersion similar to that of highly dispersible precipitated silicas, the hydrotalcite according to the invention or prepared according to the process of the invention provides this composition preferably:

with good rheological properties and an excellent aptitude for vulcanization at least comparable to those of highly dispersible precipitated silicas, with particularly advantageous dynamic properties, in particular a Payne effect of relatively low amplitude, hence a rather low rolling resistance for the tires based on this composition, and/or a rather low maximum of tangent δ, hence a low dissipation of the mechanical energy, with good reinforcing in terms of modulus.

It also generally results in the production of a polymer composition having high resistance to thermal aging and to UV aging (ultraviolet radiation).

It should be noted that the silica intercalated between the layers of the hydrotalcite exhibits neither the disadvantage of forming a filler/polymer interface which can interfere with the use of a coupling agent, in particular under severe stress conditions, nor the disadvantage of being converted into a poison.

The present invention also relates to the finished articles based on the polymer compositions described above (in particular based on the vulcanizates mentioned above).

Mention may thus be made of tire covers, in particular the sidewalls and the tire tread strip. The hydrotalcite can be used in the tire internal rubber: it can in particular improve the impermeability (in particular to air) thereof, which can make it possible to avoid the use of a halobutyl elastomer (chlorobutyl or bromobutyl elastomer, for example) and/or to employ, preferably predominantly, natural rubber instead.

Mention may also be made, as finished articles, of floor coverings, shoe soles, components of vehicle caterpillar tracks, rollers for cableways, seals for domestic electrical appliances, seals for liquid or gas pipes, braking system seals, sheathings, cables, transmission belts, gas barriers or flame-retardant materials.

The following examples illustrate the invention without, however, limiting the scope thereof.

EXAMPLE 1

Silica-Intercalated Hydrotalcite without Extragranular Silica (H1)

1) Preparation

A solution comprising the Mg and Al cations is obtained by dissolving $MgCl_2.6H_2O$ and $AlCl_3.6H_2O$ in water. The Mg concentration is 0.5 mol/l and the Mg/Al molar ratio is 3.

500 ml of the solution comprising the Mg and Al cations prepared above and a volume V of a sodium silicate solution with an $SiO_2/Na_2O$ ratio by weight of 3.55, comprising 5.55% of $Na_2O$ and having a density of 1.227 (measured at 20° C.), are introduced simultaneously over 54 minutes into a vessel heel comprising 500 ml of water, this volume V corresponding to an Si/Al molar ratio of the final product equal to 1, the pH of the reaction medium being regulated at a value of 9 by simultaneous addition of a 4 mol/kg sodium hydroxide solution. The temperature of the reaction medium is maintained at 30° C. throughout this simultaneous addition and is then brought to and maintained at 90° C. for 2 hours.

The product obtained is subsequently washed with water to remove the sodium chloride.

2) Characterization

The chemical analysis of the final product makes it possible to determine its composition; it thus exhibits the following molar ratios: Mg/Al=2.8 and Si/Al=1.0.

Its diagram obtained by XRD (X-Ray Diffraction) corresponds to that of a hydrotalcite, with a first attenuated peak (0,0,n) and a small angle intercalation peak at approximately 4 nm.

Fine hydrotalcite platelets of approximately 30 to 50 nm in the plane and with a thickness of approximately 5 nm are observed by TEM (Transmission Electron Microscopy). Extragranular silica is not observed.

The determination of the zeta potential as a function of the pH shows that the surface charge as a function of the pH is positive, as for a standard hydrotalcite, over the pH range from 6.5 to 10. In point of fact, as the surface charge of a silica is negative, this confirms that the silica formed is not found at the surface of the hydrotalcite but is intercalated between the hydrotalcite layers.

EXAMPLE 2

Silica-Intercalated Hydrotalcite with Extragranular Silica (H2)

1) Preparation

The preparation is carried out as in example 1, except that the volume V of sodium silicate solution introduced corresponds to an Si/Al molar ratio of the final product equal to 3.

2) Characterization

The chemical analysis of the final product makes it possible to determine its composition; it thus exhibits the following molar ratios: Mg/Al=2.8 and Si/Al=3.0.

Its diagram obtained by XRD (X-Ray Diffraction) corresponds to that of a hydrotalcite, with a first excessively attenuated peak (0,0,n) and a small angle intercalation peak at approximately 4 nm.

Fine hydrotalcite platelets are observed by TEM (Transmission Electron Microscopy). Extragranular noncrystalline silica is observed.

The determination of the zeta potential as a function of the pH shows that the surface charge as a function of the pH is negative over the pH range from 4 to 10. This confirms that a portion of the silica formed is found at the surface of the hydrotalcite, in addition to the silica intercalated between the hydrotalcite layers.

EXAMPLE 3

Three polymer compositions are prepared:
- one comprising precipitated silica of high dispersibility Z1165 MP sold by Rhodia, with a BET specific surface of 150 m²/g and a density of 2.1 g/cm³ (reference composition R),
- one comprising hydrotalcite H1 prepared in example 1 (composition C1),
- one comprising hydrotalcite H2 prepared in example 2 (composition C2).

TABLE 1

(compositions in parts by weight)

|  | Composition R | Composition C1 | Composition C2 |
|---|---|---|---|
| SBR[1] | 100 | 100 | 100 |
| Z1165MP | 50 | 0 | 0 |
| Hydrotalcite H1 | 0 | 50 | 0 |
| Hydrotalcite H2 | 0 | 0 | 50 |
| Silane Si69[2] | 4.0 | 4.0 | 4.0 |
| Diphenylguanidine | 1.45 | 1.45 | 1.45 |
| Stearic acid | 1.1 | 1.1 | 1.1 |
| Zinc oxide | 1.82 | 1.82 | 1.82 |
| Antioxidant[3] | 1.45 | 1.45 | 1.45 |
| Sulfenamide[4] | 1.3 | 1.3 | 1.3 |
| Sulfur | 1.1 | 1.1 | 1.1 |

[1]Styrene/butadiene copolymer synthesized in solution (Buna VSL 5525-0 type), sold by Bayer
[2]Filler/polymer coupling agent (sold by Degussa)
[3]N-(1,3-Dimthylbutyl)-N'-phenyl-p-phenylenenediamine
[4]N-cyclohexyl-2-benzothiazolesulfenamide The compositions are prepared by working the elastomers thermally/mechanically in an internal mixer (Brabender type) with a volume equal to 75 cm³, in one stage, with a mean speed of the blades of 52 revolutions/minute, until a temperature of 110° C. is obtained, this stage being followed by an acceleration stage carried out in an internal mixer (Brabender type) and then by a finishing stage carried out on an external mixer.

The vulcanization of the compositions is suited to the kinetics of vulcanization of the corresponding blends.

The properties of the compositions are set out below, the measurements having been carried out (on the vulcanized compositions) according to the following standards and/or methods:

Vulcanization Properties

Standard NF T 43015

A Monsanto 100 S rheometer is used, in particular for the measurement of the minimum torque (Cmin) and of the maximum torque (Cmax).

Ts2 corresponds to the time during which control of the mixing is possible; the polymer blend cures from Ts2 (beginning of the vulcanization).

T90 corresponds to the time, at the end of which 90% of the vulcanization has been carried out.

Mechanical Properties

Tension (moduli): standard NF T 46002

The moduli x % correspond to the stress measured at x % of deformation under tension.

Dynamic Properties

The real modulus (G') and the imaginary modulus (G"), along with the tangent of the loss angle (tan δ), defined as the ratio of G" to G', are measured at different degrees of deformation on a mechanical spectrometry device (Viscoanalyzer VA2000 from Metravib RDS).

The conditions of the test (deformation scanning operations, at fixed temperature and fixed frequency, in order to determine in particular the nonlinearity properties of the compositions (Payne effect)) are as follows:

The test specimens are parallelepipedal in shape (length 6 mm, width 4 mm, thickness 2.5 mm, approximately). A sinusoidal deformation of increasing amplitude is applied at a constant frequency of 5 Hz. G', G" and tan δ are evaluated at each degree of deformation. Hereinbelow, ΔG' refers to the difference between the modulus G' measured at a deformation under shear conditions of 0.001 and the modulus G' measured at a deformation under shear conditions of 1, and tan δ max corresponds to the maximum of the tangent of the loss angle as a function of the deformation.

TABLE 2

|  | Composition R | Composition C1 | Composition C2 |
| --- | --- | --- | --- |
| Vulcanization |  |  |  |
| Cmin (in · lb) | 13.1 | 29.4 | 26.0 |
| Ts2 (min) | 7.3 | 3.0 | 3.4 |
| T90 (min) | 42.3 | 46.3 | 45.3 |
| Cmax (in · lb) | 74.5 | 77.8 | 70.0 |
| Mechanical |  |  |  |
| Modulus 100% (MPa) | 2.8 | 4.3 | 2.9 |
| Modulus 250% (MPa) | 8.3 | 13.1 | 10.9 |
| Dynamic (Payne effect) |  |  |  |
| ΔG' (MPa) | 8.2 | 4.4 | 1.9 |
| Tan δ max | 0.47 | 0.28 | 0.24 |

It is found that compositions C1 and C2 according to the invention exhibit an advantageous compromise in properties in comparison with that of the reference composition R.

With vulcanization kinetics comparable to those of the reference composition R, compositions C1 and C2 result in a more pronounced reinforcing in terms of moduli.

Moreover this reinforcing effect is perceptible from the very low deformations.

Furthermore, the dynamic properties of compositions C1 and C2 are quite advantageous in comparison with those of the reference composition R: this is because compositions C1 and C2 have a lower amplitude of the fall in the modulus (that is to say, nonlinearity), accompanied by a substantially lower maximum of tangent δ as a function of the deformation (hence a very low dissipation of the mechanical energy).

Very good dispersion of the particles of hydrotalcite H1 and H2 respectively in compositions C1 and C2, comparable with that of the silica in the reference composition R, is observed by SEM (Scanning Electron Microscopy) and TEM (Transmission Electron Microscopy).

The invention claimed is:

1. A magnesium aluminum hydrotalcite intercalated by precipitated silica, the magnesium aluminum hydrotalcite having a Mg/Al molar ratio of between 2 and 4.

2. The hydrotalcite as claimed in claim 1, having a Si/Al cation molar ratio equal to 1.

3. The hydrotalcite as claimed in claim 1, further comprising in addition to the silica intercalated between its layers, silica at its surface.

4. The hydrotalcite as claimed in claim 3, having a Si/Al cation molar ratio of greater than 1.

5. A process for the preparation of a magnesium aluminum hydrotalcite intercalated by precipitated silica, the magnesium aluminum hydrotalcite having a Mg/Al molar ratio of between 2 and 4, comprising a step of simultaneous adding to a vessel heel formed of water:
   (a) either of (1) a solution comprising salts of a magnesium cation, and an aluminum cation, or of (2) two solutions, one comprising a salt of a magnesium cation, and the other comprising a salt of an aluminum cation,
   (b) a silicate solution, and
   (c) a basic agent solution.

6. The process as claimed in claim 5, wherein the duration of the simultaneous addition is between 30 and 90 minutes.

7. The process as claimed in claim 6, wherein the temperature during the simultaneous addition is maintained between 20 and 40° C.

8. The process as claimed in claim 5, wherein, on conclusion of the simultaneous addition, the hydrotalcite obtained is heated, optionally between 80 and 95° C., for 1 to 3 hours.

9. A polymer or co-polymer composition, comprising as a filler, at least one hydrotalcite as claimed in claim 1.

10. The polymer composition as claimed in claim 9, wherein the polymer or co-polymer has at least one glass transition temperature of between −150 and +300° C.

11. The polymer composition as claimed in claim 9, based on at least one thermoplastic elastomer.

12. The polymer composition as claimed in claim 9 further comprising at least one coupling agent and/or at least one coating agent.

13. A finished article based on at least one composition as defined in claim 9.

14. The hydrotalcite as claimed in claim 4, having a Si/trivalent cation molar ratio of greater than 2.

15. The process for the preparation of a magnesium aluminum hydrotalcite as claimed in claim 5, wherein the silicate solution is an alkali metal silicate solution.

* * * * *